United States Patent
Chou et al.

(10) Patent No.: US 9,787,124 B2
(45) Date of Patent: Oct. 10, 2017

(54) CHARGING DEVICE

(71) Applicant: POWERTECH INDUSTRIAL CO., LTD., New Taipei (TW)

(72) Inventors: Yi-Hsiung Chou, New Taipei (TW); Chih-Shang Chiang, Keelung (TW)

(73) Assignee: POWERTECH INDUSTRIAL CO., LTD., New Taipei (TW)

( * ) Notice: Subject to any disclaimer, the term of this patent is extended or adjusted under 35 U.S.C. 154(b) by 188 days.

(21) Appl. No.: 14/878,026

(22) Filed: Oct. 8, 2015

(65) Prior Publication Data

US 2016/0105040 A1   Apr. 14, 2016

(30) Foreign Application Priority Data

Oct. 9, 2014  (TW) .............................. 103135223 A

(51) Int. Cl.
*H02J 7/04* (2006.01)
*H02J 7/02* (2016.01)
*H02J 7/00* (2006.01)

(52) U.S. Cl.
CPC ............ *H02J 7/007* (2013.01); *H02J 7/0021* (2013.01); *H02J 7/0052* (2013.01); *H02J 2007/0059* (2013.01); *H02J 2007/0062* (2013.01)

(58) Field of Classification Search
CPC ......... H02J 7/007; H02J 7/0021; H02J 7/0052
USPC ......................................... 320/162, 111, 149
See application file for complete search history.

(56) References Cited

U.S. PATENT DOCUMENTS

| | | | |
|---|---|---|---|
| 8,312,199 B2 | 11/2012 | Johnson | |
| 8,648,494 B2 * | 2/2014 | Chiang | H02J 9/061 307/64 |
| 9,190,843 B2 * | 11/2015 | Chiang | H02J 3/14 |
| 9,350,182 B2 * | 5/2016 | Han | H02J 7/0042 |
| 9,525,248 B2 * | 12/2016 | Chiang | H01R 13/6691 |
| 2007/0222301 A1 * | 9/2007 | Fadell | G06F 1/266 307/152 |
| 2014/0217962 A1 * | 8/2014 | Kim | H02J 7/0013 320/107 |
| 2014/0361729 A1 * | 12/2014 | Cooper | H02J 7/0036 320/107 |

(Continued)

FOREIGN PATENT DOCUMENTS

TW        M422229 U1    2/2012
WO   WO 2014/051610 A1  4/2014

*Primary Examiner* — M'Baye Diao
(74) *Attorney, Agent, or Firm* — Li & Cai Intellectual Property (USA) Office

(57) ABSTRACT

A charging device includes a plurality of DC charging ports, a detecting circuit and a current output unit. The DC charging ports includes at least one first charging port and at least one second charging port. The output currents provided by the first charging port and the second charging port are lower than or equal to a first current limit and a second current limit, respectively. The detecting circuit is coupled to the DC charging ports to detect the output currents from the DC charging ports. When the current required by the first charging port is lower than the first current limit, the current output unit correspondingly supplies a requested current to the first charging port and distributes a surplus current to the second charging port. A total current limit of the DC charging ports is higher than a supply current limit.

10 Claims, 6 Drawing Sheets

(56) References Cited

U.S. PATENT DOCUMENTS

| | | | |
|---|---|---|---|
| 2015/0364945 A1* | 12/2015 | Miller | H02J 5/005 320/108 |
| 2016/0048197 A1* | 2/2016 | Hanssen | G06F 1/3293 713/323 |

* cited by examiner

CHARGING DEVICE

BACKGROUND

1. Technical Field

The present invention relates to a charging device and, more particularly, to a charging device with charging priority.

2. Description of Related Art

The current charging device is capable of distributing various charging currents to multiple electronic devices connected thereto. For example, Taiwan Patent M422229 discloses a charging device capable of automatically distributing various charging currents to the electronic devices connected to the charging device. When the charging device is connected to multiple electronic devices, the charging device identifies the electrical characteristics of the electronic devices and charges the electronic devices by distributing various charging currents to the electronic devices according to charging rule data.

However, since the charging device of Taiwan Patent M422229 charges the electronic devices according to the charging rule data previously stored, the user cannot decide which electronic device to have higher priority of being charged.

SUMMARY

The present invention provides a charging device including a plurality of direct-current (DC) charging ports with different current limits and a charging priority sequence, by which the user may decide to connect a certain electronic device to a DC charging port having higher charging priority to perform rapid charging on the electronic device precedently.

One embodiment of the present invention provides a charging device capable of charging a plurality of electronic devices and including a plurality of DC charging ports and a current output unit. The plurality of DC charging ports includes at least one first charging port and at least one second charging port. An output current provided by the at least one first charging port is lower than or equal to a first current limit. An output current provided by the at least one second charging port being lower than or equal to a second current limit. The current output unit is coupled to the plurality of DC charging ports. An output current provided by the current output unit is lower than or equal to a supply current limit. The current output unit limits the output current from the at least one first charging port according to the first current limit. The current output unit supplies a requested current to the at least one first charging port upon a request by the at least one first charging port and distributes a surplus current to the at least one second charging port when the requested current to the at least one first charging port is lower than the first current limit. A total current limit of the DC charging ports is higher than a supply current limit. The first current limit may be higher than, equal to or lower than the second current limit. The current output unit distributes the surplus current to the at least one second charging port when the requested current to the at least one first charging port is lower than the first current limit.

Another embodiment the present invention provides a charging device capable of charging a plurality of electronic devices and including a plurality of DC charging ports, a detecting circuit and a current output unit. The plurality of DC charging ports includes at least one first charging port and at least one second charging port. An output current provided by the at least one first charging port is lower than or equal to a first current limit. An output current provided by the at least one second charging port being lower than or equal to a second current limit. The detecting circuit is coupled to the plurality of DC charging ports to detect an output current from each of the plurality of DC charging ports. The current output unit is coupled to the plurality of DC charging ports and the detecting circuit. An output current provided by the current output unit is lower than or equal to a supply current limit. The current output unit limits the output current from the at least one first charging port according to the first current limit. The current output unit supplies a requested current to the at least one first charging port upon a request by the at least one first charging port and distributes a surplus current to the at least one second charging port when the requested current to the at least one first charging port is lower than the first current limit. The first current limit is higher than the second current limit and is lower than the supply current limit. A total current limit of the DC charging ports is higher than the supply current limit.

To sum up, the charging device of the present invention includes a plurality of DC charging ports with different current limits. The DC charging port with a higher current limit has higher charging priority. Accordingly, rapid charging is achieved when an electronic device is connected to the DC charging port with a higher current limit. In other words, compared to the conventional charging device, the charging device of the present invention provides a charging priority sequence corresponding to the different current limits of plurality of DC charging ports. The user may decide to connect a certain electronic device to a DC charging port with a higher current limit and higher charging priority so as to perform rapid charging on the electronic device.

In order to further understand the techniques, means and effects of the present disclosure, the following detailed descriptions and appended drawings are hereby referred to, such that, and through which, the purposes, features and aspects of the present disclosure can be thoroughly and concretely appreciated; however, the appended drawings are merely provided for reference and illustration, without any intention to be used for limiting the present disclosure.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DESCRIPTION OF THE EXEMPLARY EMBODIMENTS

One Embodiment of Charging Device

The present invention provides a charging device capable of charging a plurality of electronic devices and including a plurality of DC charging ports and a current output unit. The plurality of DC charging ports includes at least one first charging port and at least one second charging port. An output current provided by the at least one first charging port is lower than or equal to a first current limit. An output current provided by the at least one second charging port being lower than or equal to a second current limit. The current output unit is coupled to the plurality of DC charging ports. An output current provided by the current output unit is lower than or equal to a supply current limit. The current output unit limits the output current from the at least one first charging port according to the first current limit. The current output unit supplies a requested current to the at least one first charging port upon a request by the at least one first charging port and distributes a surplus current to the at least one second charging port when the requested current to the at least one first charging port is lower than the first current limit. The first current limit may be higher than, equal to or lower than the second current limit. The current output unit distributes the surplus current to the at least one second charging port when the requested current to the at least one first charging port is lower than the first current limit.

Figure 1:
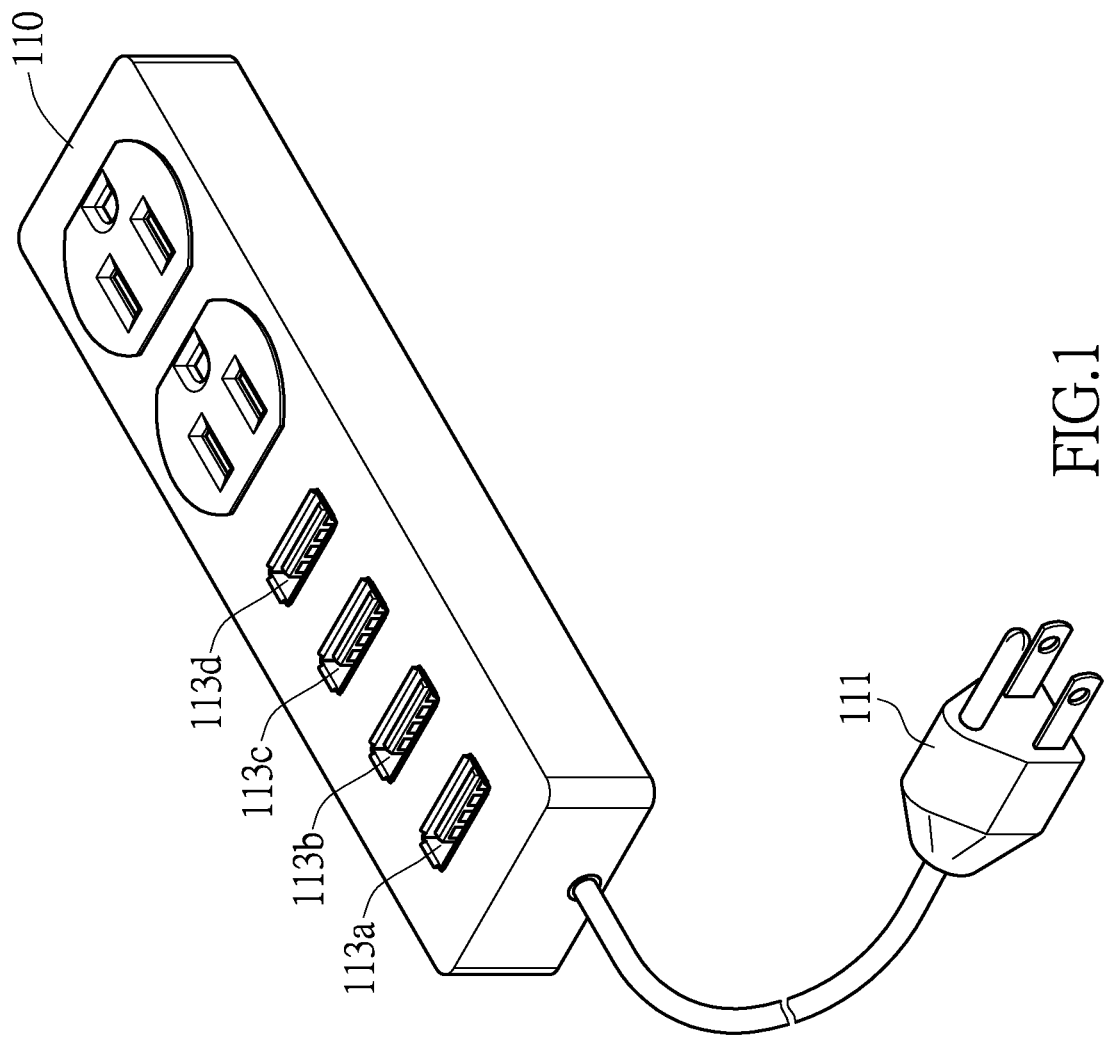
FIG. 1 is a perspective view of a charging device according to one embodiment of the present invention.
Figure 2:
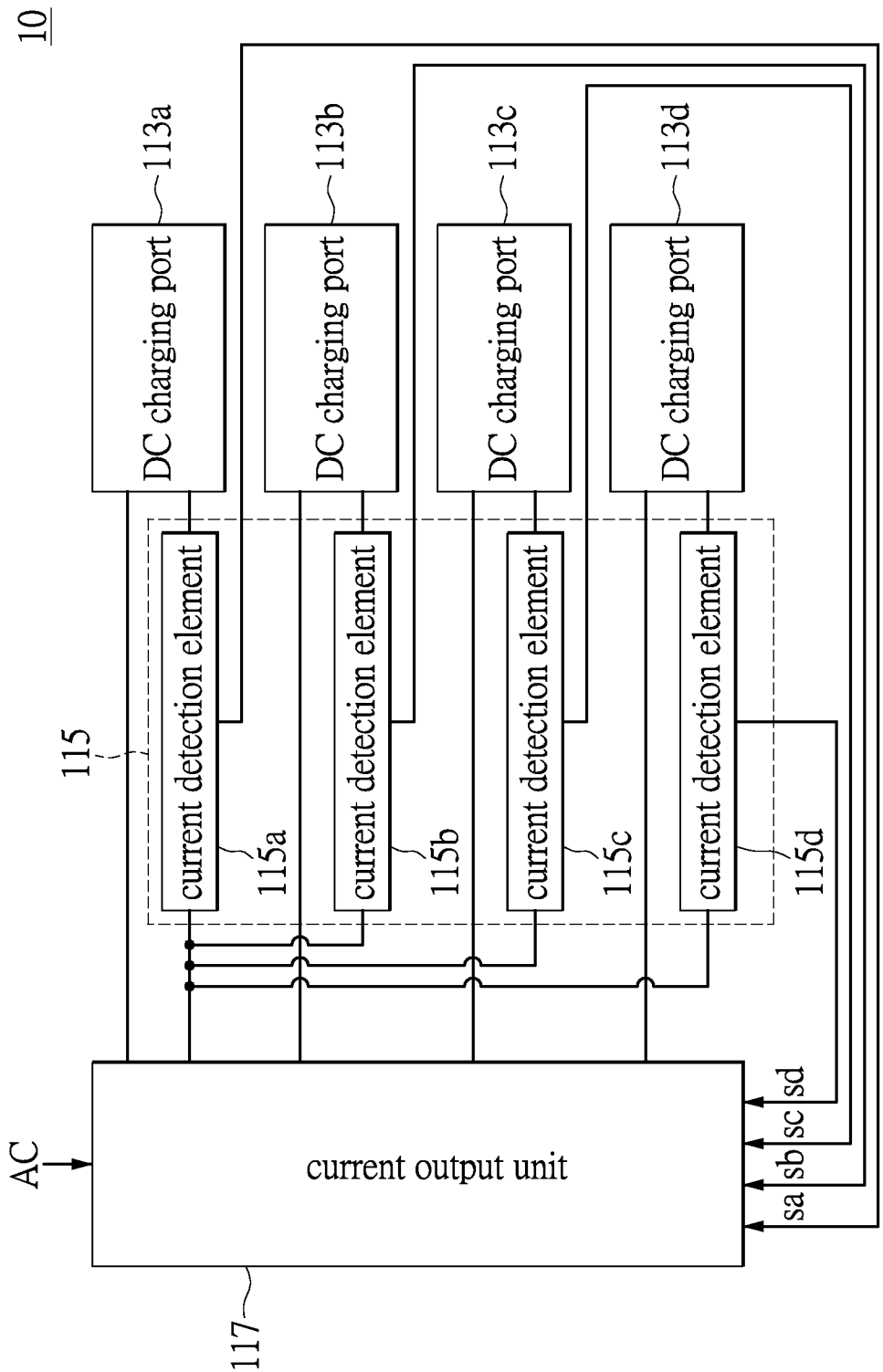
FIG. 2 is a block diagram of a charging device according to one embodiment of the present invention.

Referring to FIG. 1 and FIG. 2, a case, where the first current limit of the first charging port is higher than the second current limit of the second charging port, is taken as an example. However, in other embodiments, the first current limit may be equal to or lower than the second current limit. When the requested current to the first charging port is lower than the first current limit, the surplus current is distributed to the at least one second charging port. FIG. 1 is a perspective view of a charging device according to one embodiment of the present invention. FIG. 2 is a block diagram of a charging device according to one embodiment of the present invention. The charging device 10 includes a main body 110, a power input interface 111, a plurality of DC charging ports 113a~113d, a detecting circuit 115 and a current output unit 117. The detecting circuit 115 is illustrated in FIG. 2. However, in other embodiments, the charging device 10 may also do without the detecting circuit 115. In the present embodiment, the charging device 10 is an extension power outlet. The charging device 10 has a main body 110 being connected through a cord to the power input interface 111. The main body 110 is provided with a plurality of DC charging ports 113a~113d disposed on the surface, and a detecting circuit 115 and a current output unit 117 inside the main body 110. It should be noted that the charging device 10 of the embodiment in FIG. 1 is exemplified by an extension power outlet. However, the present invention is not limited to the previous example of the charging device 10. In other words, the charging device 10 may also be a wall outlet. Furthermore, the main body 110 of the charging device 10 may also be provided with three-hole AC sockets or two-hole AC sockets, in addition to the DC charging ports 113a~113d. Moreover, it should also be noted that the present invention is not limited to the number of DC charging ports disposed on the charging device 10. In other words, the charging device 10 may be provided with at least two DC charging ports.

As shown in FIG. 2, the detecting circuit 115 is coupled to the DC charging ports 113a~113d, and the current output unit 117 is coupled to the AC power AC, the DC charging ports 113a~113d and the detecting circuit 115. The current output unit 117 is coupled to the AC power AC (i.e., the utility system) through the power input interface 111. The current output unit 117 is capable of converting AC power AC into DC power and distributing the DC power to the DC charging ports 113a~113d so that the DC charging ports 113a~113d supply identical or non-identical currents to charge electronic devices connected thereto. The DC charging ports 113a~113d may be DC universal series bus (USB) sockets. The electronic devices may be mobile phones, notebook computers, digital cameras, personal digital assistants or other electronic devices that require DC power.

The detecting circuit 115 includes a plurality of current detection elements 115a~115d. The current detection elements 115a~115d are all coupled to the current output unit 117. The current detection elements 115a~115d are coupled to the DC charging ports 113a~113d, respectively, to detect the output current of each of the DC charging ports 113a~113d. Thereby, the current output unit 117 receives detection signals sa~sd through the detecting circuit 115 to determine whether the DC charging ports 113a~113d supply sufficient requested current to the electronic devices.

In the present embodiment, the current output unit 117 provides each of the DC charging ports with a current limit and a charging priority. In other words, the current provided by each of the DC charging ports 113a~113d is lower than or equal to a corresponding current limit. The DC charging port with a high current limit has higher charging priority. Thereby, the DC charging port with a high current limit may supply a higher charging current to an electronic device connected thereto precedently to achieve rapid charging. It should be noted that a total current limit of the DC charging ports 113a~113d is higher than a supply current limit of the current output unit 117. The total current limit is the sum of the current limits of the DC charging ports 113a~113d. The supply current limit is the maximal current that the charging device 10 can supply based on the AC power AC. Therefore, the current supplied by the charging device 10 is lower than or equal to the supply current limit.

To describe the charging device 10 of the present invention in more details, some examples are presented herein.

For example, if the current limit of the DC charging port 113a is 2A, the current limits of the DC charging ports 113b~113d are all 1A, and the supply current limit of the current output unit 117 is 4A, the current output unit 117 precedently supplies a current (lower than 2A) to the DC charging port 113a and equally distributes a surplus current to the DC charging ports 113b~113d when the DC charging port 113a is connected to an electronic devices requesting a current from the current output unit 117. More particularly, for example, if the requested current by the DC charging port 113a is 1.6A, the current output unit 117 precedently supplies a current of 1.6A to the DC charging port 113a and equally distributes a surplus current (i.e., 4A−1.6A=2.4A) to the DC charging ports 113b~113d. In other words, the current distributed to the DC charging port 113b, the DC charging port 113c and the DC charging port 113d is 0.8A, respectively. After the electronic device connected to the DC charging port 113a is charged completely, the current output unit 117 lowers the current distributed to the DC charging port 113a, and correspondingly increases the current distributed to the DC charging ports 113b~113d. Accordingly, the current supplied by the DC charging ports 113b~113d may reach 1A at most.

As stated previously, if at least one of the DC charging ports 113b~113d has a higher current limit, the at least one DC charging port has higher charging priority. Therefore, when an electronic device requests a current from the at least one DC charging port, the current output unit 117 supplies a current to the at least one DC charging port according to the request by the at least one charging port and equally distributes a surplus current to the rest of the DC charging ports.

Furthermore, for example, if the current limit of the DC charging port 113a is 2A, the current limits of the DC charging ports 113b~113d are 1.5A, 1A and 0.5A, respectively, and the supply current limit of the current output unit 117 is 4A, the current output unit 117 determines the charging priority sequence of the DC charging ports 113a~113d according to the current limit of each of the DC charging ports 113a~113d. In other words, according to the current limit of each of the DC charging ports 113a~113d, the DC charging port 113a has the first charging priority, the DC charging port 113b has the second charging priority, the DC charging port 113c has the third charging priority and the DC charging port 113d has the fourth charging priority. The DC charging port with higher charging priority may charge the electronic device prior to the other DC charging ports. More particularly, if all the DC charging ports 113a~113d are connected to electronic devices, respectively, the current output unit 117 distribute different currents to the DC charging ports 113a~113d according to the charging priority sequence of the DC charging ports 113a~113d. In other words, if the current requested by the DC charging ports 113a~113d is 1.8 A, 1.2A, 1A and 0.5A, respectively, the current distributed to the DC charging ports 113a~113d is 1.8 A, 1.2A, 1A and 0A, respectively. Afterwards, when one of the electronic devices connected to the DC charging ports 113a~113c is completely charged, the current output unit 117 will increase the current distributed to the DC charging port 113d (lower than 0.5A) so that the DC charging port 113d is able to charge the electronic device connected thereto.

As stated previously, when the sum of the currents requested by at least two DC charging ports with higher charging priority is higher than or equal to the supply current limit of the current output unit 117, the current output unit 117 stops supplying current to the DC charging ports with lower charging priority so that DC charging ports with higher charging priority can be charged precedently.

In short, since at least one DC charging port of the charging device 10 is provided with a higher current limit and higher charging priority, the user may decide which electronic device to precedently perform rapid charging on or decide the charging priority sequence of the electronic devices by connecting certain electronic devices to the DC charging ports.

Figure 3:
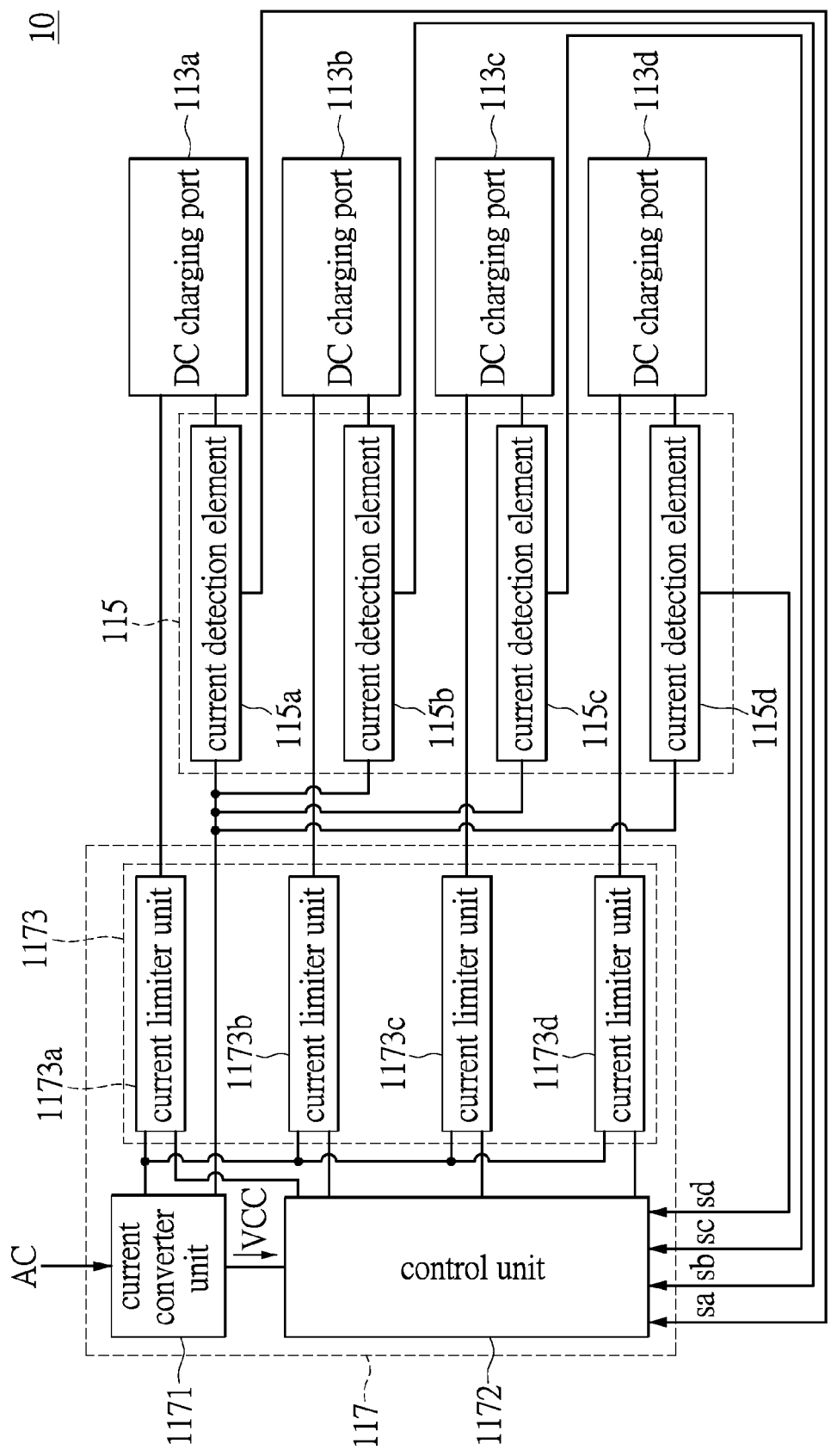
FIG. 3 is a detailed block diagram of the charging device in FIG. 1.

Next, the operation of the charging device 10 will be further described. Referring to FIG. 3, FIG. 3 is a detailed block diagram of the charging device in FIG. 1. The current output unit 117 includes a current converter unit 1171, a control unit 1172 and a current distributor unit 1173. The current converter unit 1171 is coupled to the power input interface 111 (not shown in FIG. 3), the control unit 1172, the current distributor unit 1173 and the detecting circuit 115. The current distributor unit 1173 is coupled to the DC charging ports 113a~113d and the control unit 1172. The control unit 1172 is coupled to the detecting circuit 115 (interconnection therebetween not shown in FIG. 3). In the present embodiment, each of the current detection elements 115a~115d further includes a resistor. Both terminals of the resistor may be coupled to the control unit 1172 so that the control unit 1172 acquires the voltage across the resistor.

The current converter unit 1171 may be an AC-to-DC converter, which receives through the power input interface 111 and converts AC power AC into DC power to supply currents to the DC charging ports 113a~113d and the control unit 1172. The control unit 1172 is powered by the DC power VCC.

The current distributor unit 1173 includes a plurality of current limiter units 1173a~1173d. The plurality of current limiter units 1173a~1173d are all coupled to the current converter unit 1171 and the control unit 1172. The current limiter units 1173a~1173d are further coupled to the DC charging ports 113a~113d, respectively, to limit the currents distributed to the DC charging ports 113a~113d. The current limiter units 1173a~1173d may be implemented by a plurality of switching transistors.

The control unit 1172 distributes different currents to the DC charging ports 113a~113d through the current distributor unit 1173 and limits the currents distributed to the DC charging ports 113a~113d to be lower than or equal to the respective current limit. The control unit 1172 may be implemented by a plurality of discrete elements or a microcontroller with firmware, or a software module with a CPU based on software. The present invention is not limited to the previous examples of the control unit 1172.

In the present embodiment, assuming that the DC charging port 113a has a first current limit and the DC charging ports 113b~113d have a second current limit (where the first current limit is higher than the second current limit), when the DC charging port 113a is connected to an electronic device, the control unit 1172 lowers the current provided by the DC charging ports 113b~113d through the current distributor unit 1173 to supply the current (lower than or equal to the first current limit) to the DC charging port 113a precedently so that the DC charging port 113a performs rapid charging on the electronic device connected thereto. On the other hand, if the DC charging port 113a is not connected to any electronic device or is connected to an electronic device that has been completely charged, the control unit 1172 controls, through the current distributor unit 1173, the highest current that the DC charging ports 113b~113d can supply to respond to the second current limit. In other words, the DC charging ports 113b~113d may provide a current lower than or equal to the second current limit.

On the other hand, if the DC charging ports 113a~113d have different current limits, the control unit 1172 determines a charging priority sequence according to the current limit of each of the DC charging ports. In other words, the DC charging port with a higher current limit has higher charging priority. Therefore, when the DC charging port with higher charging priority is connected to an electronic devices, the control unit 1172 controls, through the current distributor unit 1173, the DC charging port with higher charging priority to perform charging prior to other DC charging ports.

Another Embodiment of Charging Device

Figure 4A:
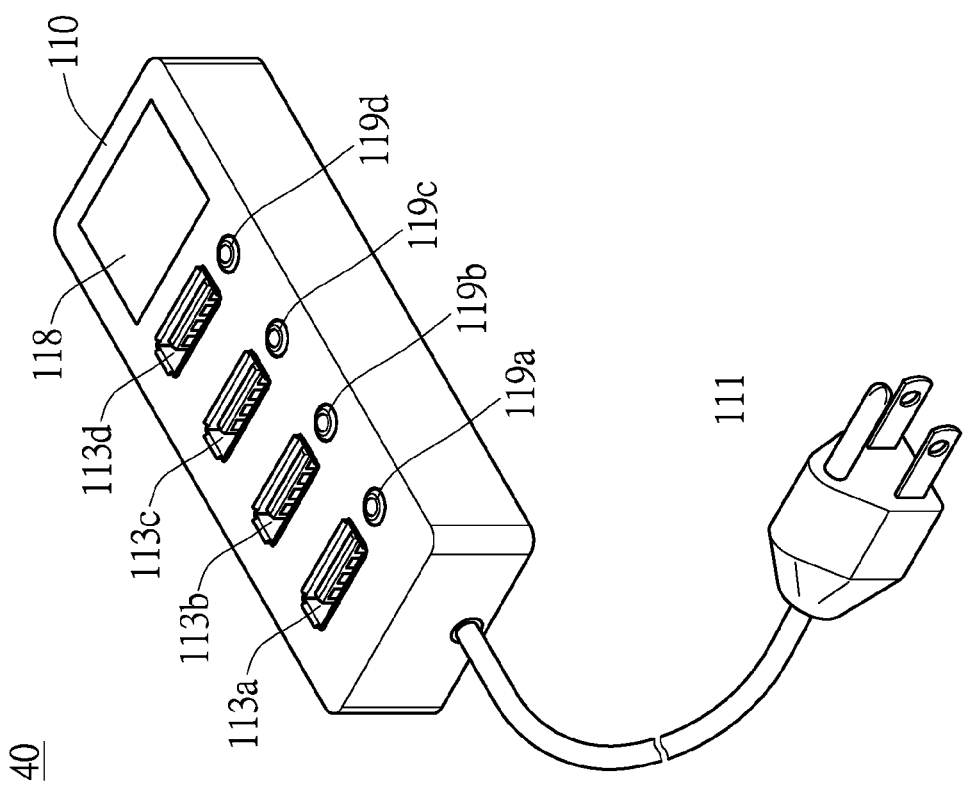
FIG. 4A is a perspective view of a charging device according to another embodiment of the present invention.

Referring to FIG. 4A, FIG. 4A is a perspective view of a charging device according to another embodiment of the present invention. In the present embodiment, the charging device 40 in FIG. 4A is different from the charging device 10 in FIG. 1 to FIG. 3 in that the charging device 40 further includes a display unit 118 and a rapid charging key 119a. The display unit 118 and the rapid charging key 119a are coupled to the control unit 1172. The control unit 1172 controls the display unit 118 to correspondingly display power information of the DC charging ports 113a~113d according to the detection signals sa~sd. The power information includes, for example, the current limits of the DC charging ports 113a~113d, the present output current, the charging priority sequence, etc. The rapid charging key 119a corresponds to the DC charging port 113a and controls the DC charging port 113a to perform charging prior to the DC charging ports 113b~113d.

In the present embodiment, when the rapid charging keys 119a~119d are all unpressed, the DC charging ports 113a~113d have the same current limit and the same charging priority. In other words, the DC charging ports 113a~113d share the DC current supplied by the current converter unit 1171. However, when the rapid charging key 119a is pressed, the DC charging port 113a has a higher charging limit and higher charging priority. In other words, the DC charging port 113a acquires a higher current than the other DC charging ports 113b~113d to perform rapid charging on the electronic device connected thereto. Afterwards, the DC charging ports 113b~113d share the surplus current.

In another embodiment, the DC charging port 113a has a higher current limit than the other DC charging ports 113b~113d. Before the rapid charging key 119a is pressed, the DC charging ports 113a~113d have the current limit and the same charging priority to share the DC current supplied by the current converter unit 1171. However, when the rapid charging key 119a is pressed, DC charging port 113a has higher charging priority. In other words, the DC charging port 113a is activated to perform rapid charging. Accordingly, the DC charging port 113a may supply a higher charging current to the electronic device connected thereto to achieve rapid charging. The DC charging ports 113b~113d share the surplus current.

In still another embodiment, the DC charging port 113a has a higher current limit and higher charging priority than the DC charging ports 113b~113d. Before the rapid charging key 119a is pressed, the DC charging port 113a supplies power prior to the DC charging ports 113b~113d. However, when the rapid charging key 119a is pressed, the charging priority of the DC charging port 113a is invalidated and the DC charging ports 113a~113d share the DC current supplied by the current converter unit 1171.

Figure 4B:
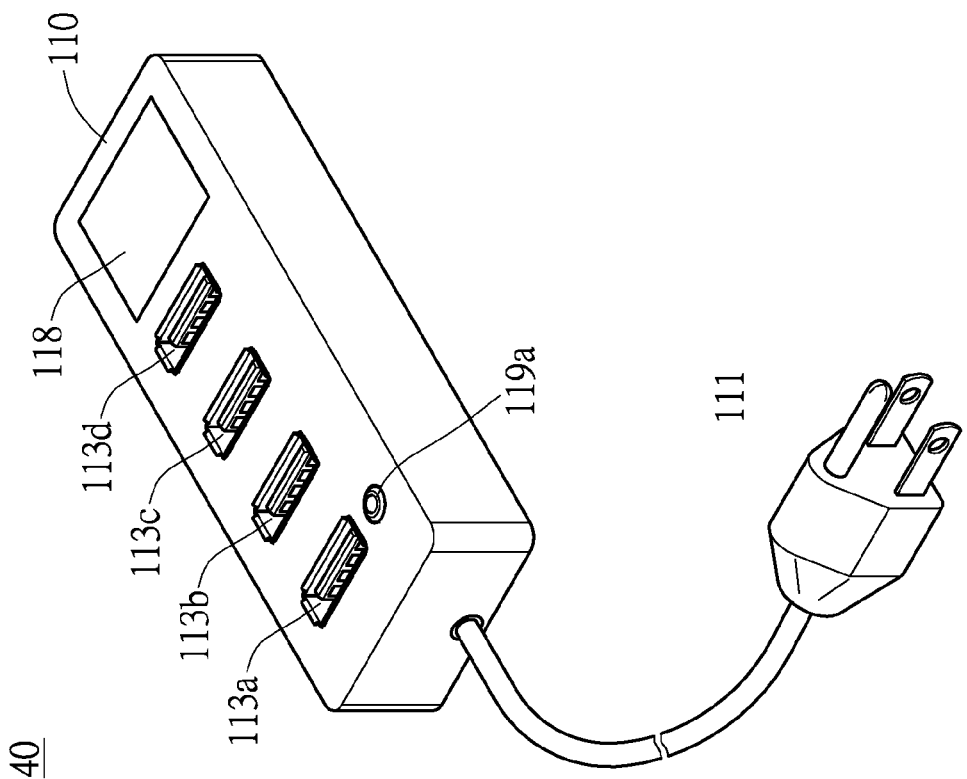
FIG. 4B is a perspective view of a charging device according to still another embodiment of the present invention.
Figure 5:
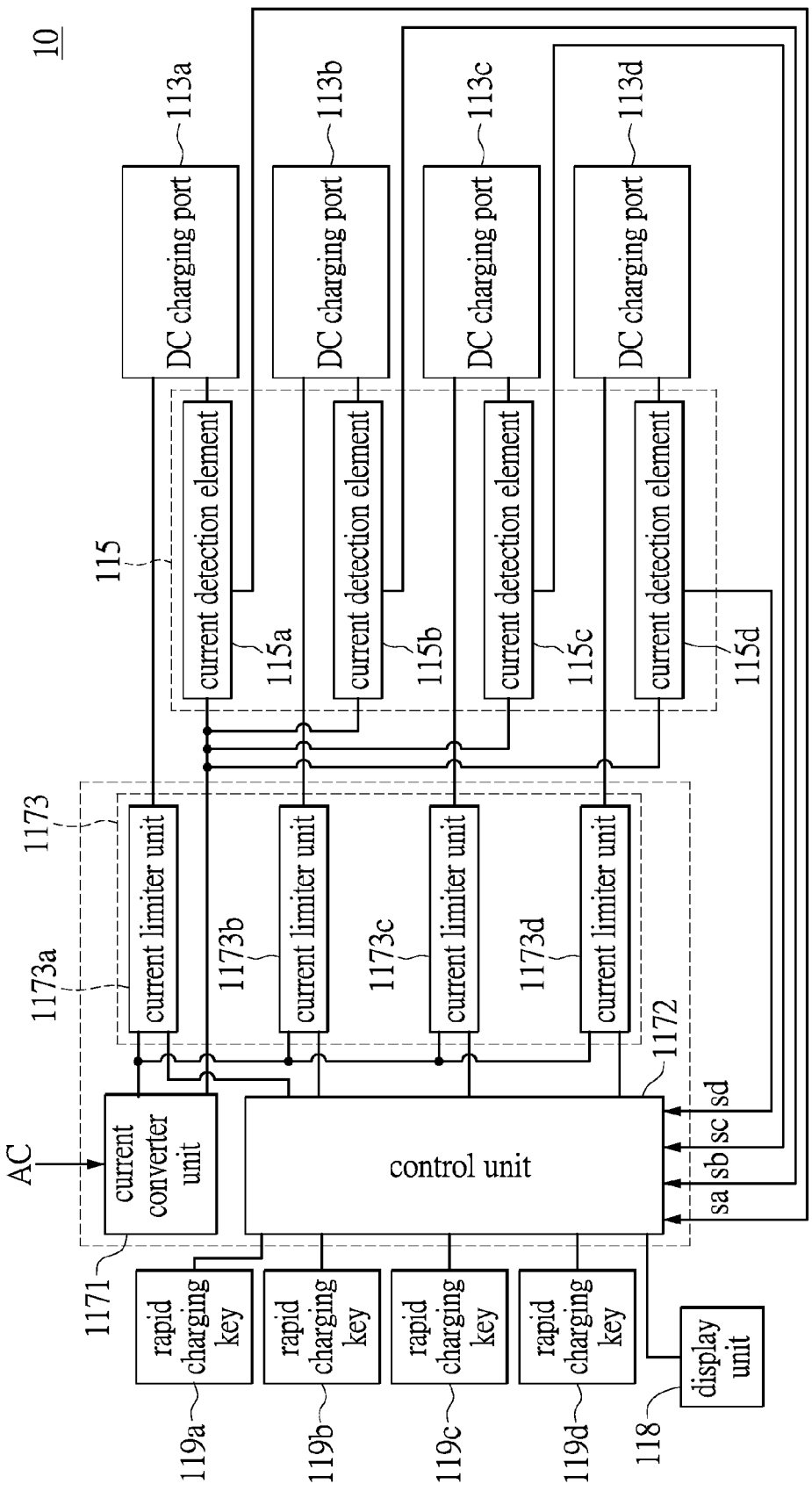
FIG. 5 is a detailed block diagram of the charging device in FIG. 4B.

Referring to FIG. 4B and FIG. 5, FIG. 4B is a perspective view of a charging device according to still another embodiment of the present invention and FIG. 5 is a detailed block diagram of the charging device in FIG. 4B. In the present embodiment, the charging device 40 in FIG. 4B is different from the charging device 40 in FIG. 4 in that the charging device 40 in FIG. 4B includes a plurality of rapid charging keys 119a~119d. The rapid charging keys 119a~119d are coupled to the control unit 1172.

In the present embodiment, the rapid charging keys 119a~119d correspond to the DC charging ports 113a~113d, respectively, to control a corresponding DC charging port to supply power prior to the other DC charging ports. In other words, by pressing any of the rapid charging keys, the user may determine that one of the DC charging ports has a higher current limit and higher charging priority. Thereby, the user may use the rapid charging keys 119a~119d to determine which DC charging port to perform rapid charging.

It should be noted that the charging device 40 further includes a plurality of indicator lamps. The indicator lamps correspond to the rapid charging keys 119a~119d, respectively. When any of the rapid charging keys is pressed, a corresponding indicator lamp emits light to indicate which DC charging port is activated or inactivated to perform charging. Moreover, the present invention is not limited to the number of rapid charging keys and the number of indicator lamps of the charging device 40.

In another operation mode, when all of the four charging keys 119a~119d are unpressed, the four DC charging ports 113a~113d have the same priority and the DC charging ports 113a~113d share the DC current supplied by the current converter unit 1171. When two of the rapid charging key, for example 119a and 119c, are pressed, the corresponding DC charging ports 113a, 113c have higher charging priority. The current converter unit 1171 precedently supplies the requested currents to the DC charging ports 113a, 113c, and the DC charging port 113b, 113d share the surplus current. Similarly, the user may press multiple rapid charging keys 119a~119d so that the corresponding DC charging ports have higher charging priority and the other DC charging port(s) share the surplus current. Moreover, in another embodiment, a single rapid charging key may correspond to a set of DC charging ports (for example, two DC charging ports). The present invention is not limited to the number of DC charging ports corresponding to a single rapid charging key.

It should be noted that the details of the charging device have been described with FIG. 1~FIG. 3 in the previous embodiments and are not repeated herein.

Another Embodiment of Charging Device

Figure 6:
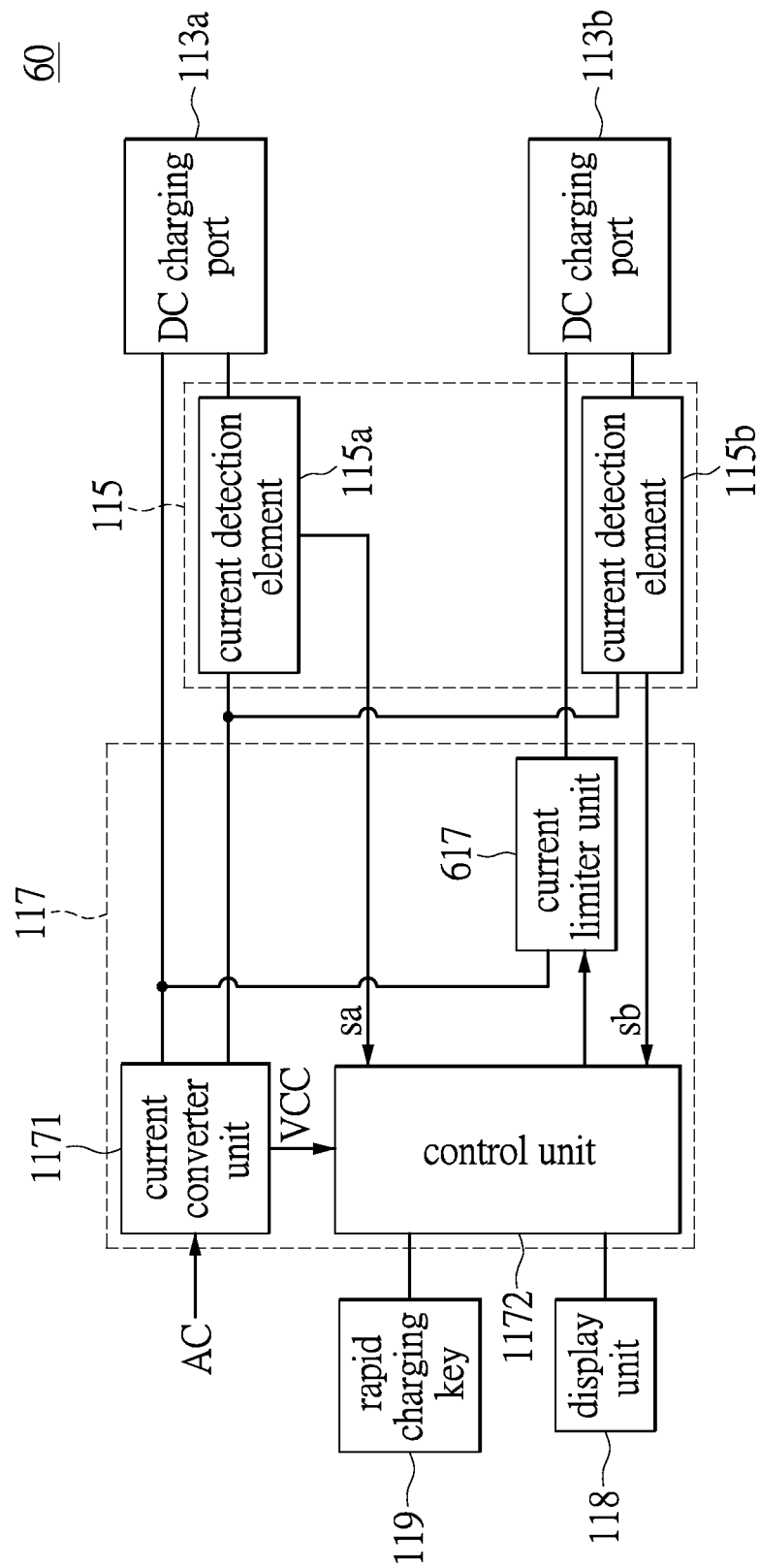
FIG. 6 is a detailed block diagram of a charging device according to another embodiment of the present invention.

Referring to FIG. 6, FIG. 6 is a detailed block diagram of a charging device according to another embodiment of the present invention. The charging device 60 includes a DC charging port 113a, a DC charging port 113b, a detecting circuit 115, a current output unit 117, a display unit 118 and a rapid charging key 119. The detecting circuit 115 is coupled to the DC charging port 113a and the DC charging port 113b. The current output unit 117 is coupled to the AC power AC, the display unit 118, the rapid charging key 119, the detecting circuit 115, the DC charging port 113a and the DC charging port 113b.

Furthermore, the current output unit 117 includes a current limiter unit 617, a current converter unit 1171 and a control unit 1172. The detecting circuit 115 includes a current detection element 115a and a current detection element 115b. The current converter unit 1171 is coupled to the DC charging port 113a, the current detection element 115a, the current limiter unit 617, the control unit 1172 and the AC power AC. The control unit 1172 is coupled to the display unit 118, the rapid charging key 119, the current detection element 115a, the current detection element 115b and the current limiter unit 617. The DC charging port 113a and the DC charging port 113b are coupled to the current limiter unit 617. The DC charging port 113a and the DC charging port 113b are coupled to the current detection element 115a and the current detection element 115b, respectively.

In the present embodiment, the DC charging port 113a and the DC charging port 113b may correspond to a common current limiter unit and a common rapid charging key. The control unit 1172 distributes, through the current limiter unit 617, different or identical currents to the DC charging port 113a and the DC charging port 113b to limit the currents supplied by the DC charging port 113a and the DC charging port 113b to be lower than or equal to a respective current limit. Moreover, in the present embodiment, the rapid charging key 119 corresponds to the current detection element 115a to control the current detection element 115a to supply power prior to the other DC charging ports.

It should be noted that the details of the charging device have been described with FIG. 1~FIG. 5 in the previous embodiments and are not repeated herein.

To sum up, the charging device of the present invention includes a plurality of DC charging ports with different current limits. The DC charging port with a higher current limit has higher charging priority. Accordingly, rapid charging is achieved when an electronic device is connected to the DC charging port with a higher current limit. In other words, compared to the conventional charging device, the charging device of the present invention provides a charging priority sequence corresponding to the different current limits of plurality of DC charging ports. The user may decide to connect a certain electronic device to a DC charging port with a higher current limit and higher charging priority so as to perform rapid charging on the electronic device.

The above-mentioned descriptions represent merely the exemplary embodiments of the present disclosure, without any intention to limit the scope of the present disclosure thereto. Various equivalent changes, alterations or modifications based on the claims of present disclosure are all consequently viewed as being embraced by the scope of the present disclosure.

What is claimed is:

1. A charging device capable of charging a plurality of electronic devices, comprising:
    a plurality of DC charging ports, comprising at least one first charging port and at least one second charging port, an output current provided by said at least one first charging port being lower than or equal to a first current limit, an output current provided by said at least one second charging port being lower than or equal to a second current limit;
    a detecting circuit being coupled to said plurality of DC charging ports to detect an output current from each of said plurality of DC charging ports; and
    a current output unit being coupled to said plurality of DC charging ports and said detecting circuit, an output current provided by said current output unit being lower than or equal to a supply current limit;
    wherein said current output unit limits said output current from said at least one first charging port according to said first current limit, and said current output unit supplies a requested current to said at least one first charging port upon a request by said at least one first charging port and distributes a surplus current to said at least one second charging port when said requested current to said at least one first charging port is lower than said first current limit.

2. The charging device of claim 1, further comprising:
    a first rapid charging key corresponding to said at least one first charging port for deciding whether said at least one first charging port has priority of being charged over said at least one second charging port.

3. The charging device of claim 1, wherein a total current limit of said plurality of DC charging ports is equal to the sum of said first current limit of said at least one first charging port and said second current limit of said at least one second charging port.

4. The charging device of claim 1, further comprising:
    a second rapid charging key corresponding to said at least one second charging port for deciding whether said at least one second charging port has priority of being charged over said at least one first charging port.

5. The charging device of claim 1, wherein said plurality of DC charging ports further comprises at least one third charging port, an output current provided by said at least one third charging port being lower than or equal to a third current limit, said current output unit stops supplying said output current to said third charging port when the sum of said requested current to said at least one first charging port and said surplus current to said at least one second charging port is higher than or equal to said supply current limit.

6. The charging device of claim 5, wherein said third current limit is lower than said second current limit.

7. The charging device of claim 5, wherein said first current limit, said second current limit and said third current limit are determined by said current output unit, and the charging sequence of said at least one first charging port, said at least one second charging port and said at least one third charging port is determined according to said first current limit, said second current limit and said third current limit.

8. The charging device of claim 1, wherein said current output unit equally distributes said surplus current to said at least one second charging port after said current output unit outputs said requested current to said at least one first charging port.

9. The charging device of claim 1, wherein said current output unit comprises:
    a power conversion unit for receiving and converting AC power into DC power;
    a current distributor unit being coupled to said power conversion unit and said plurality of DC charging ports to distribute said DC power to said plurality of DC charging ports; and
    a control unit being coupled to said power conversion unit and said detecting circuit to control said current distributor unit to distribute said DC power to said plurality of DC charging ports.

10. The charging device of claim 1, further comprising a display unit coupled to said current output unit to display the value of said output current from each of said plurality of DC charging ports.

* * * * *